United States Patent
Grobelny et al.

(10) Patent No.: US 11,196,721 B2
(45) Date of Patent: Dec. 7, 2021

(54) SYSTEMS AND METHODS FOR ESTABLISHING A SECURE COMMUNICATION CHANNEL BETWEEN AN INFORMATION HANDLING SYSTEM AND A DOCKING STATION

(71) Applicant: DELL PRODUCTS L.P., Round Rock, TX (US)

(72) Inventors: Nicholas Grobelny, Austin, TX (US); Daniel L. Hamlin, Round Rock, TX (US); Vivekanandh N. Rajagopalan, Bangalore (IN); Marcin M. Nowak, Round Rock, TX (US); Joshua N. Alperin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 321 days.

(21) Appl. No.: 16/271,750

(22) Filed: Feb. 8, 2019

(65) Prior Publication Data
US 2020/0259805 A1    Aug. 13, 2020

(51) Int. Cl.
*H04L 29/06* (2006.01)
*G06F 21/85* (2013.01)
(Continued)

(52) U.S. Cl.
CPC ........ *H04L 63/0435* (2013.01); *G06F 1/1632* (2013.01); *G06F 21/85* (2013.01);
(Continued)

(58) Field of Classification Search
CPC . H04L 9/3268; H04L 63/166; H04L 63/0435; H04L 9/0822; H04L 9/0844;
(Continued)

(56) References Cited

U.S. PATENT DOCUMENTS

2005/0188193 A1*  8/2005  Kuehnel ............... H04L 63/083
                                                       713/155
2014/0282978 A1*  9/2014  Lerner .................. H04L 63/083
                                                       726/7
(Continued)

OTHER PUBLICATIONS

Tian et al., "SoK: "Plug & Pray" Today—Understanding USB Insecurity in Versions 1 through C" Published in: 2018 IEEE Symposium on Security and Privacy (SP) Date of Conference: May 20-24, 2018, Electronic ISBN :978-1-5386-4353-2, pp. 1-16 (Year: 2018).*

(Continued)

*Primary Examiner* — Harunur Rashid
(74) *Attorney, Agent, or Firm* — Egan Enders & Huston LLP.

(57) ABSTRACT

Embodiments of systems and methods are provided herein to establish a secure communication channel for communicating dock configuration actions from an administrator information handling system (IHS) to a docking station. One embodiment of such a system includes an administrator IHS configured to communicate dock configuration actions to a docking station, a host IHS configured to verify the validity of a dock certificate received from the docking station against a dock certificate authority server, and a docking station configured to verify the validity of an administrator certificate received from the admin IHS against a preconfigured list of valid administrator certificates stored within the docking station. If the validity of the dock certificate and the administrator certificate are respectively verified by the host IHS and the docking station, the host IHS and the docking station are further configured to establish the secure communication channel between the administrator IHS and the docking station.

20 Claims, 6 Drawing Sheets

(51) Int. Cl.
- *H04L 9/14* (2006.01)
- *G06F 1/16* (2006.01)
- *H04L 9/08* (2006.01)

(52) U.S. Cl.
CPC .............. *H04L 9/0822* (2013.01); *H04L 9/14* (2013.01); *H04L 63/067* (2013.01); *H04L 63/166* (2013.01)

(58) Field of Classification Search
CPC ....... H04L 63/067; H04L 9/14; G06F 1/1632; G06F 21/85
See application file for complete search history.

(56) References Cited

U.S. PATENT DOCUMENTS

| | | | | |
|---|---|---|---|---|
| 2016/0328579 | A1* | 11/2016 | Jois | G06F 21/85 |
| 2017/0099152 | A1* | 4/2017 | Kojima | H04L 9/3247 |
| 2017/0214671 | A1* | 7/2017 | Lehr | H04L 9/0869 |

OTHER PUBLICATIONS

Network Working Group, "The Transport Layer Security (TLS) Protocol Version 1.3 draft-ietf-tls-tls13-28", Mar. 20, 2018, 157 pages.

Acunetix, "TSL/SSL Explained—Establishing a TLS Connection, Part 5 (https://www.acunetic.com/blog/aritcles/establishing-tls-ssl-connection-part-5/)", Mar. 2, 2017, 6 pages.

Wikipedia, "Transport Layer Security", captured from the internet on Dec. 10, 2018, 33 pages.

Promoter Group, "Universal Serial Bus Type-C Authentication Specification", Jul. 24, 2017, 66 pages.

Blake-Wilson et al., "Elliptic Curve Cryptography (ECC) Cipher Suites for Transport Layer Security (TLS)", Network Working Group, 2006, 35 pgs.

Superspeed, "USB 3.0 Promoter Group Defines Authentication Protocol for USB Type-C", Press Release, Apr. 13, 2016, 2 pgs.

IT Security Guru, "DigiCert Selected by USB-IF to Operate Managed PKI for USB Type-C Authentication", Nov. 19, 2018, 4 pgs.

* cited by examiner

SYSTEMS AND METHODS FOR ESTABLISHING A SECURE COMMUNICATION CHANNEL BETWEEN AN INFORMATION HANDLING SYSTEM AND A DOCKING STATION

FIELD

This invention relates generally to information handling systems and docking stations, and more particularly, to systems and methods to establish a secure communication channel between an information handling system and a docking station.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some portable information handling systems (e.g., notebook computers, tablet computers, 2-in-1 computers, etc.) having docking connectors that enable the system to be connected to, or docked with, a docking station. In addition to supplying power to the information handling system (IHS), the docking station may provide the IHS with additional functionality, such as various connections to monitors, printers, and wired or wireless networks. In some cases, information handling systems, docking stations and/or other peripheral devices may be managed by an information technology (IT) administrator.

An IT administrator is a person or group that is responsible for the upkeep, configuration, and reliable operation of a group of information handling systems and peripheral devices. In some cases, an IT administrator may want to ensure that they have complete control over the configuration of the systems and devices they manage. When managing docking stations, for example, an IT administrator may want complete control over firmware updates, as well as any changes made to the configuration, restrictions and/or security of the docking station. When managing a docking station over a network, however, malicious software ("malware") can be used to observe and modify communications transmitted over a network communication channel between the IT administrator and a host system to which the docking station is connected, thereby compromising docking station ownership and control. For example, malware can modify the commands or actions transmitted from the IT administrator to the docking station (via the host system) to change restrictions set by the IT administrator on docking station capability and/or to downgrade the docking station firmware or security. It would be desirable to provide a secure communication channel over which an IT administrator can make changes to a docking station, while preventing malicious software from making unauthorized changes to the docking station.

SUMMARY OF THE INVENTION

The following description of various embodiments of systems and related methods is not to be construed in any way as limiting the subject matter of the appended claims.

According to various embodiments of the present disclosure, improved systems and methods are provided herein to establish a secure communication channel between an administrator information handling system (IHS) and a docking station via a host IHS, which is connected to or docked with the docking station. In one embodiment, the systems and methods described herein may be used to provide a secure communication channel over which an IT administrator (or simply "Admin") can make changes to the docking station, while preventing malicious software from making unauthorized changes to the docking station. Although exemplary embodiments of the systems and methods provided herein describe a secure communication channel over which an administrator IHS communicates actions (otherwise referred to herein as dock configuration actions) to a host IHS for reading docking station configuration information and/or making changes to a docking station, alternative embodiments may function similarly when an administrator IHS requests a host IHS to read information stored within and/or make a change to other types of peripheral devices (e.g., USB-C displays or video monitors, USB-C or Thunderbolt graphics adapter enclosures, USB-C network adapters, USB-C keyboards, mice, chargers, or video adapters (converters), etc.). As such, the disclosure provided herein is intended to cover all such embodiments.

According to one embodiment, a system provided herein may generally include an administrator information handling system (Admin IHS), a docking station and a host IHS, which is communicatively coupled to the administrator IHS via a network connection and communicatively coupled to the docking station via a docking connection. The IHS includes a processing device, which is configured to execute program instructions to communicate dock configuration actions to a docking station. The host IHS includes a processing device, which is configured to execute program instructions to establish a secure communication channel over which the dock configuration actions are communicated from the administrator IHS to the docking station via the host IHS. When the host IHS is connected to the docking station via the docking connection (i.e., when the host IHS is docked with the docking station), the docking station is coupled to send a dock certificate to the host IHS and receive an administrator certificate associated with the Admin IHS (or the Admin) from the host IHS. The docking station includes a processing device, which is configured to execute program instructions to verify the validity of the administrator certificate against a preconfigured list of valid administrator certificates stored within the docking station before the secure communication channel is established.

The host IHS is coupled to receive the dock certificate from the docking station and configured to verify the validity of the dock certificate against a dock certificate authority server. In some embodiments, the dock certificate may be a Universal Serial Bus (USB) Type-C certificate, which is stored within the docking station. In some embodiments, the secure communication channel may be established only if the validity of the dock certificate and the administrator certificate are respectively verified by the host IHS and the docking station.

The host IHS and the docking station may each utilize Transport Layer Security (TLS) protocols to generate symmetric session keys, which are used encrypt data communicated over the secure communication channel. For example, the host IHS may use the symmetric session keys to encrypt one or more dock configuration actions within a first secure message, which is communicated to the docking station over the secure communication channel. After performing the dock configuration action(s) specified in the first secure message, the docking station may use the symmetric session keys to encrypt a confirmation that the dock configuration actions were completed within a second secure message, which is communicated to the host IHS over the secure communication channel. After the second secure message is communicated from the docking station to the host IHS, the docking station and the host IHS may either continue to communicate over the secure communication channel (e.g., to communicate additional dock configuration actions), or may delete the symmetric session keys to close the secure communication channel and return to unencrypted communications.

According to another embodiment, a method performed by a host IHS to establish a secure communication channel between an administrator IHS and a docking station is provided herein. Such a method may generally include receiving a dock configuration action from the administrator IHS via a network connection connecting the administrator IHS to the host IHS, and queuing the dock configuration action until the docking station is connected to the host IHS via a docking connection. Upon detecting the docking connection, the method may further include sending a client hello message to, and receiving a server hello message from, the docking station to initiate a Transport Layer Security (TLS) protocol; receiving a certificate message containing a Universal Serial Bus (USB) Type-C certificate from the docking station; and verifying the validity of the USB Type-C certificate against a dock certificate authority server prior to establishing the secure communication channel between the administrator IHS and the docking station.

If the validity of the USB Type-C certificate is verified by the host IHS, the method may further include receiving a certificate request from the docking station requesting an administrator certificate, and once received from the administrator IHS, sending a certificate response containing the administrator certificate to the docking station for verification. If the validity of the administrator certificate is verified by the docking station, the method may further include receiving a pre-master secret from the administrator IHS, deriving a master secret from the pre-master secret, a random number included within the client hello message and a random number included within the server hello message, and generating symmetric session keys from the master secret. The pre-master secret received from the administrator IHS is generated by the administrator IHS using a private key associated with an authorized administrator. In some embodiments, each administrator authorized to manage the docking station may have their own administrator certificate and/or private key. In some embodiments, the private key(s) may be stored within the administrator IHS or within an administrator server communicatively coupled to the administrator IHS.

Once the symmetric session keys are generated, the method may further include sending a ChangeCipherSpec message to the docking station to establish the secure communication channel between the administrator IHS and the docking station; using the symmetric session keys to encrypt the dock configuration action within a first secure message, which is sent from the host IHS to the docking station over the secure communication channel; and receiving a confirmation that the dock configuration action was completed by the docking station within a second secure message, which is sent from the docking station to the host IHS over the secure communication channel. Upon receiving the second secure message, the method may either destroy the symmetric session keys to close the secure communication channel and return to unencrypted communications; or repeat the steps of using the symmetric session keys and receiving a confirmation (for one or more additional dock configuration actions) before destroying the symmetric session keys to close the secure communication channel and return to unencrypted communications.

According to another embodiment, a method performed by a docking station to establish a secure communication channel between an administrator IHS and the docking station is provided herein. Wherein upon docking with a host IHS, such a method may generally include receiving a client hello message from, and sending a server hello message to, the host IHS to initiate a Transport Layer Security (TLS) protocol, and sending a certificate message containing a Universal Serial Bus (USB) Type-C certificate to the host IHS for verification. If the validity of the USB Type-C certificate is verified by the host IHS, the method may further include sending a certificate request to the host IHS requesting an administrator certificate, which is associated with the administrator IHS; receiving a certificate response containing the administrator certificate from the host IHS; and verifying the validity of the administrator certificate against a preconfigured list of valid administrator certificates stored within the docking station prior to establishing the secure communication channel between the administrator IHS and the docking station.

If the validity of the administrator certificate is verified by the docking station, the method may further include generating a pre-master secret using a private key stored within the docking station, deriving a master secret from the pre-master secret, a random number included within the client hello message and a random number included within the server hello message, and generating symmetric session keys from the master secret. In some embodiments, the private key stored with the docking station may be paired with a public key specified in USB Type-C certificate. Once the symmetric session keys are generated, the method may further include sending a ChangeCipherSpec message to the host IHS to establish the secure communication channel between the administrator IHS and the docking station.

Some embodiments of the method may further include receiving a dock configuration action within a first secure message, which is sent from the host IHS to the docking station over the secure communication channel; performing the dock configuration action specified in the first secure message; using the symmetric session keys to encrypt a confirmation that the dock configuration action was completed by the docking station within a second secure message; and sending the second secure message to the host IHS over the secure communication channel. After sending the second secure message, the method may either destroy the symmetric session keys to close the secure communication channel and return to unencrypted communications; or repeat the steps of receiving a dock configuration action, performing the dock configuration action, using the symmetric session keys and sending the second secure message (for one or more additional dock configuration actions) before destroying the symmetric session keys to close the secure communication channel and return to unencrypted communications.

BRIEF DESCRIPTION OF THE DRAWINGS

Other advantages of the present disclosure will become apparent upon reading the following detailed description and upon reference to the accompanying drawings in which.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

Information handling systems are often equipped with various types of communication interfaces, which enable data and/or power delivery to and from the system. One example is the Universal Serial Bus (USB) interface, which is an industry standard developed by the USB Implementers Forum (USB IF) that defines characteristics of the cables, connectors and communications protocols used in a bus for connection, communication, and power delivery between information handling systems and other electronic devices. USB interfaces may take various forms, including both wired and wireless interfaces, and enable information handling systems and accessories to communicate according to a variety of data communication standards, such as USB 1.0, USB 2.0, USB 3.0/3.1/3.2, as well as any future revisions thereof. USB is currently used in many different types of information handling systems (such as desktops, laptops, tablets, mobile phones, PDAs, etc.) and accessories (such as keyboards, mice, power supplies and chargers, spare battery packs, docking stations, external hard drives, audio headsets, speakers, cameras, USB dongles, etc.).

Figure 1:
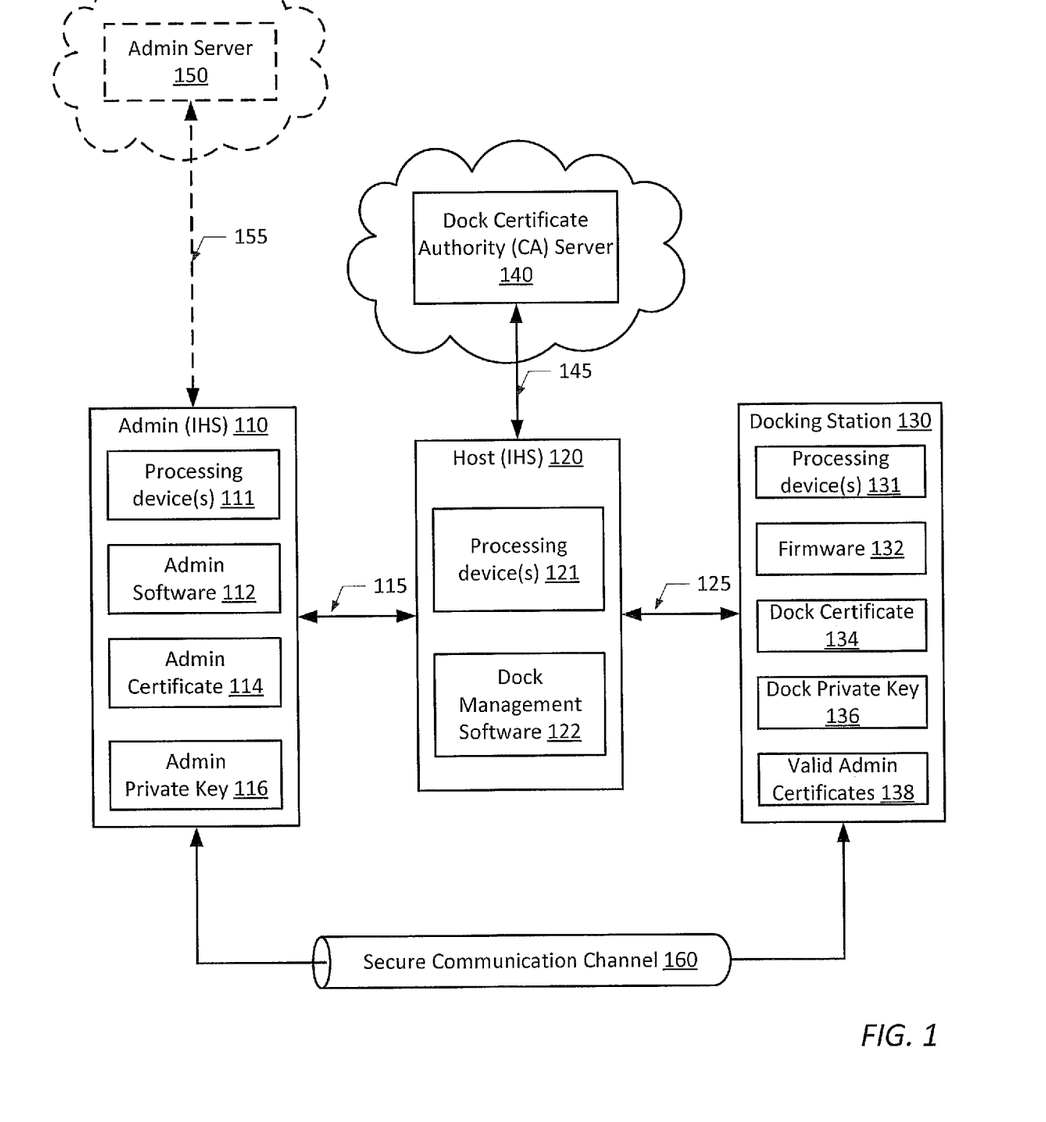
FIG. 1 is a block diagram illustrating one exemplary embodiment of a system configured to provide a secure communication channel between an administrator information handling system (Admin IHS) and a docking station.

FIG. 1 is a block diagram illustrating one exemplary embodiment of a system 100 configured to provide a secure data channel between an administrator information handling system (Admin IHS) 110 and a docking station 130, thereby providing a secure communication channel over which an IT administrator (or simply "Admin") can make changes to the docking station, while preventing malicious software from making unauthorized changes to the docking station. As shown in FIG. 1, Admin IHS 110 is communicatively coupled to a host information handling system (host IHS) 120 via a wired or wireless network connection 115. At times, host IHS 120 may be communicatively coupled or "docked" with docking station 130. When docked, the docking station provides additional functionality to the host IHS, such as various connections to monitors, printers, networks and power supplies.

Host IHS 120 may be connected to or docked with docking station 130 via a variety of different docking connectors and/or cables 125. According to one embodiment, host IHS 120 and docking station 130 may each include a USB Type C (USB-C) port, which includes a USB-C connector (receptacle or plug) for docking the host IHS to the docking station. USB-C connectors and cable configurations are described in the USB Type-C Cable and Connector Specification, the current release of which is publicly available at the USB IF website (www.usb.org) and incorporated herein in its entirety.

Docking station 130 may generally include a plurality of hardware components that enable the docking station to provide greater connectivity and additional functionality to a docked information handling system. For example, docking station 130 may include one or more processing devices 131 (e.g., one or more port controllers, interface controllers, embedded controllers, etc.) for configuring USB ports and controlling communication and power transfer thereacross. In addition, docking station 130 may include additional hardware components, such as USB and/or display ports for communicating with USB devices and display devices that may be connected or plugged into those ports, an audio codec to provide audio functionality and/or a network interface card (NIC) to provide networking functionality to the docking station. Such hardware components are generally well known in the art and are omitted from the drawings for drawing clarity.

In the example embodiment shown in FIG. 1, docking station 130 may further include software and/or firmware components, such as firmware 132, docking station certificate 134 and private key 136. Firmware 132 contains program instructions that may be stored within a computer readable memory and executed by at least one processing device 131 of the docking station (e.g., a port controller, interface controller, and/or embedded controller) to control docking station functionality, as well as to perform various steps of the methodologies disclosed herein. In some embodiments, docking station certificate 134 and private key 136 may be stored within a computer readable memory of the docking station. In other embodiments, docking station 130 may include and/or use key derivation logic to derive private key 136 each time the docking station powers up. As known in the art, docking station certificate 134 and private key 136 can be used to authenticate or verify the identity of the docking station. As described in more detail below, docking station certificate 134 and/or private key 136 can also be used to establish a secure communication channel between Admin IHS 110 and docking station 130 in accordance with embodiments of the present disclosure. Although not strictly limited to such, docking station certificate 134 may be a USB-C certificate, in one embodiment.

Host IHS 120 may generally include a plurality of hardware components, such as one or more processing devices 121 (e.g., a central processing unit, CPU, graphics processing unit, GPU, embedded controller, microcontroller, etc.) for executing program instructions, which may be stored within various types of computer readable memory (e.g., RAM, ROM, Flash, etc.) and/or computer readable storage mediums (e.g., hard disk drives, HDDs, or solid state drives, SSDs). Host IHS 120 may also include one or more network interfaces, cards and/or ports for communicating with external devices and networks, and one or more buses operable to transmit communications between the various hardware components. Such hardware components are generally well known in the art and are omitted from the drawings for drawing clarity.

In the embodiment shown in FIG. 1, host IHS 120 is communicatively coupled to Admin IHS 110 via wired or wireless network connection 115, communicatively coupled to dock certificate authority (CA) server 140 via wired or wireless network connection 145, and communicatively coupled to docking station 130 via docking connection (including docking connectors and/or cables) 125. As shown in FIG. 1, host IHS 120 may further include software and/or firmware components, such as dock management software 122. Dock management software 122 contains program instructions that may be stored within a computer readable storage medium (e.g., a HDD or SSD) and executed by at least one processing device 121 (e.g., a CPU and/or embedded controller) of the host IHS.

Figure 2A:
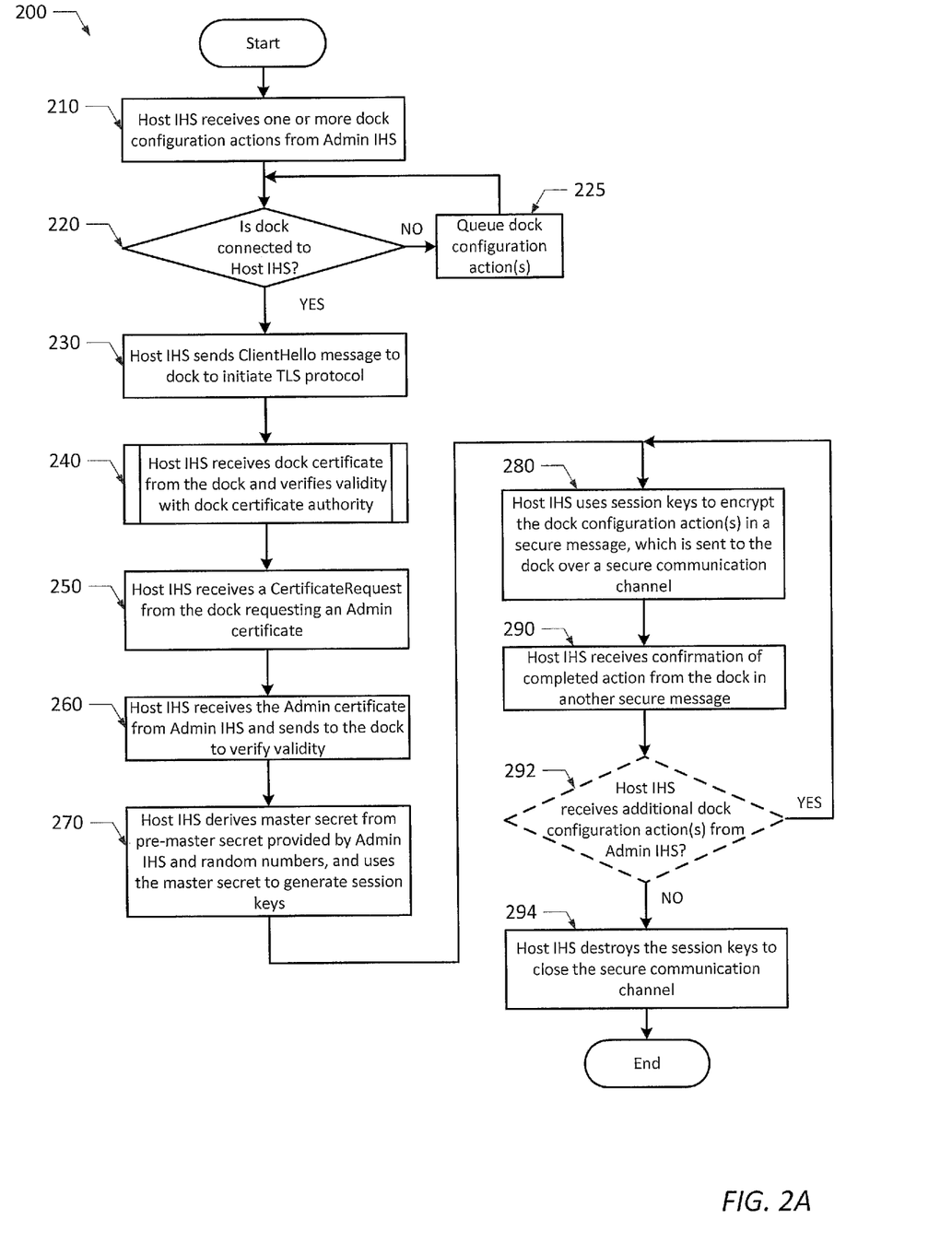
FIG. 2A is a flowchart diagram illustrating one embodiment of method steps that may be performed by a host information handling system (host IHS) coupled to a docking station to provide a secure communication channel between an Admin IHS and the docking station.
Figure 2B:
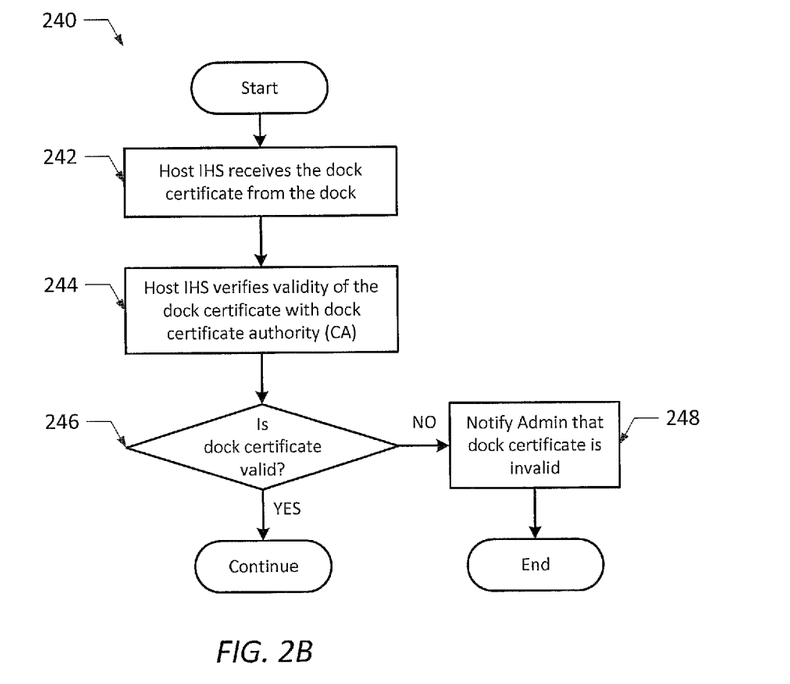
FIG. 2B is a flowchart diagram illustrating one embodiment of a method that may be performed by a host IHS to verify the validity of a dock certificate provided by a docking station to the host IHS.
Figure 4:
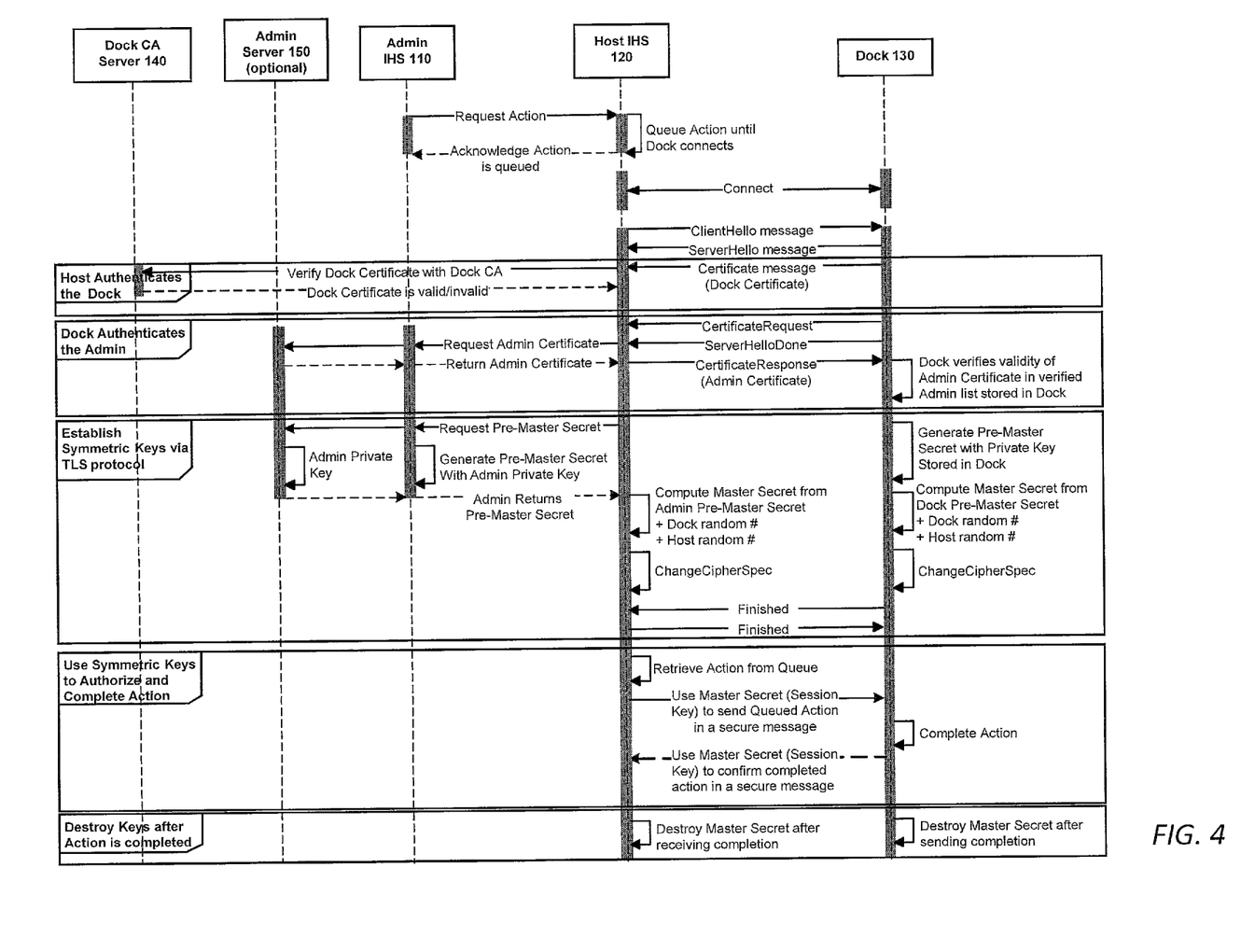
FIG. 4 is workflow diagram illustrating further details of the method steps shown in FIGS. 2A-3B.

In the example embodiment shown in FIG. 1, the at least one processing device 121 executes the program instructions within dock management software 122 to verify the validity of docking station certificate 134 and establish a secure communication channel 160 between Admin IHS 110 and docking station 130. FIGS. 2A, 2B and 4 provide additional details describing the various method steps that may be performed by host IHS 120 and dock management software 122 to verify the validity of docking station certificate 134 and establish secure communication channel 160, according to one embodiment. In other embodiments (not shown), host IHS 120 may blindly pass the docking station certificate 134 to dock CA server 140, so that the dock CA server can verify the validity of the docking station certificate.

In some embodiments, host IHS 120 may (optionally) utilize protocols specified in the USB-C Authentication Specification to authenticate docking station 130 upon detecting a docking connection to the docking station. The USB-C Authentication Specification, which is publicly available at the USB IF website (www.usb.org) and incorporated herein in its entirety, describes architectures and methods for authenticating a USB-C device (such as docking station 130), which is connected to a host IHS via USB-C connectors and/or cables. According to the USB-C Authentication Specification, a USB-C device may be authenticated using public keys contained within USB-C certificates to perform a one-way challenge/response action. A USB-C certificate is typically stored within a USB-C device at the factory. To verify the identity of a USB-C device, the validity of the USB-C certificate stored within the device may be verified against a certificate authority (CA) server (such as dock certificate authority server 140).

If USB-C certificate is determined to be valid, host IHS 120 may initiate a challenge/response action to authenticate the docking station, in an optional embodiment. For example, host IHS 120 may extract a public key from the USB-C docking station certificate, use the public key to encrypt a challenge message with a nonce (e.g., a random number) and send the encrypted challenge message to docking station 130. Upon receiving the encrypted challenge message, docking station 130 may decrypt the challenge message using private key 136, and send an encrypted response message (including the original nonce) back to the host IHS to provide proof of ownership of the private key maintained within the docking station, and thus, proof of the docking station identity. The docking station may be authenticated once the host IHS validates the response message. Additional details regarding the (optional) dock authentication process may be found in the USB-C Authentication Specification, and thus, are omitted from the drawings and the description provided herein for the sake of brevity.

In addition to (potentially) verifying the validity of docking station certificate 134 and (optionally) authenticating docking station 130, host IHS 120 communicates with Admin IHS 110 and docking station 130, via network connection 115 and docking connection 125, to establish a secure communication channel 160 between the Admin IHS and docking station. More specifically, and as described in more detail below, host IHS 120 may execute program instructions within dock management software 122 to receive actions from Admin IHS 110 to manage and/or configure docking station 130, and to initiate a cryptographic protocol to establish a secure communication channel 160 between the Admin IHS and docking station over which the actions are communicated.

Admin IHS 110 may generally include a plurality of hardware components, such as one or more processing devices 111 (e.g., a central processing unit, CPU, graphics processing unit, GPU, embedded controller, microcontroller, etc.) for executing program instructions, which may be stored within various types of computer readable memory (e.g., RAM, ROM, Flash, etc.) and/or computer readable storage mediums (e.g., hard disk drives, HDDs, or solid state drives, SSDs). Admin IHS 110 may also include one or more network interfaces, cards and/or ports for communicating with external devices and networks, and one or more buses operable to transmit communications between the various hardware components. Such hardware components are generally well known in the art and are omitted from the drawings for drawing clarity As shown in FIG. 1, Admin IHS 110 may further include software and/or firmware components, such as Admin software 112, Admin certificate 114 and private key 116. In some embodiments, Admin certificate 114 and private key 116 may be stored within a non-volatile memory or storage device of Admin IHS 110, as shown in FIG. 1. In other embodiments, Admin certificate 114 and/or private key 116 may be stored in an optional Admin server 150, which is communicatively coupled to Admin IHS 110 via a wired or wireless network connection 155. Similar to docking station certificate 134 and private key 136, Admin certificate 114 and private key 116 can be used to verify the identity of Admin IHS 110 and/or the IT administrator. In some embodiments, a separate Admin certificate 114 and/or a separate private key 116 can be used to verify the identity of each IT administrator that is authorized to manage and make changes to docking station 130.

Figure 3A:
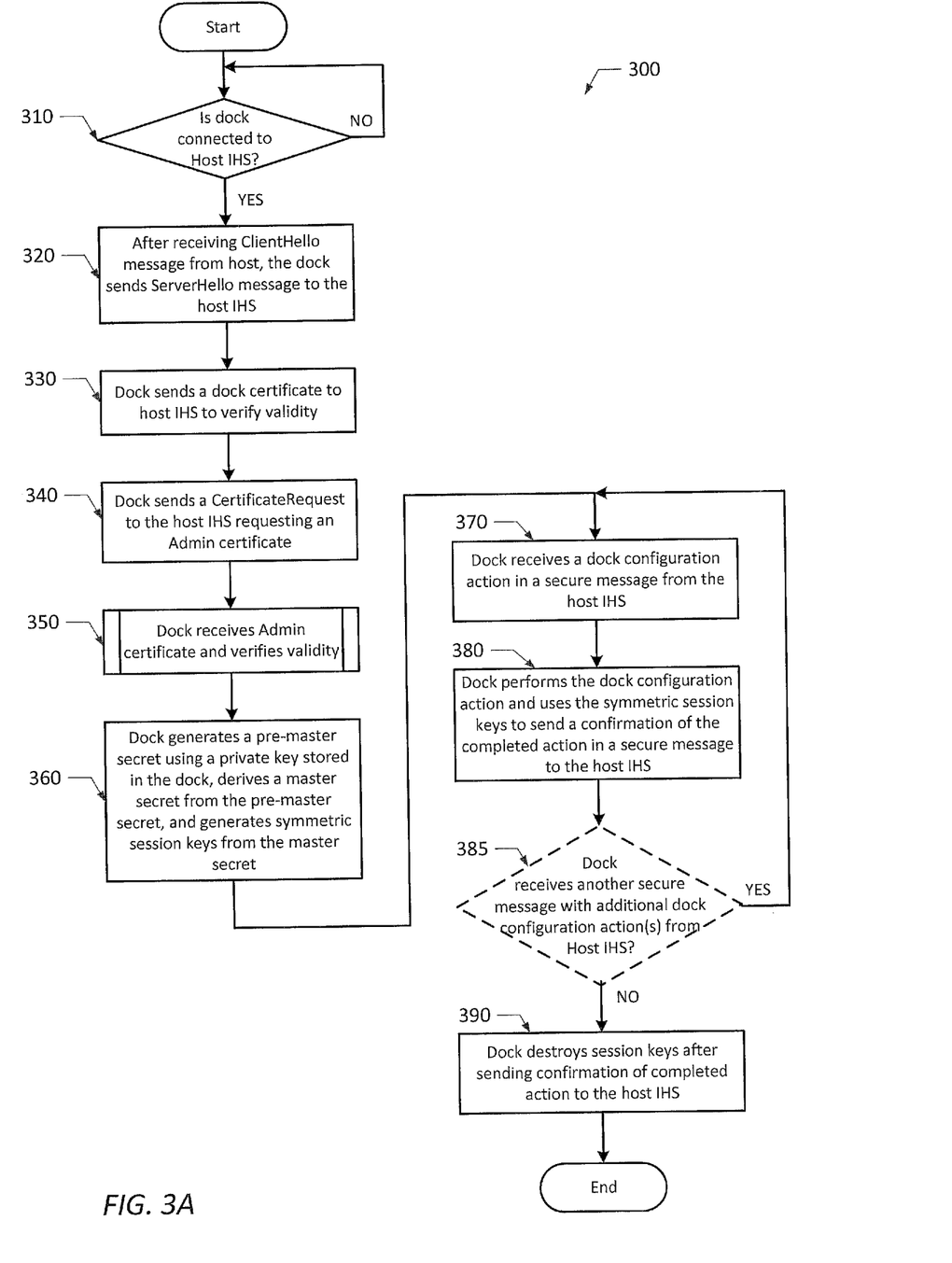
FIG. 3A is a flowchart diagram illustrating one embodiment of method steps that may be performed by a docking station to provide a secure communication channel between an Admin IHS and the docking station.
Figure 3B:
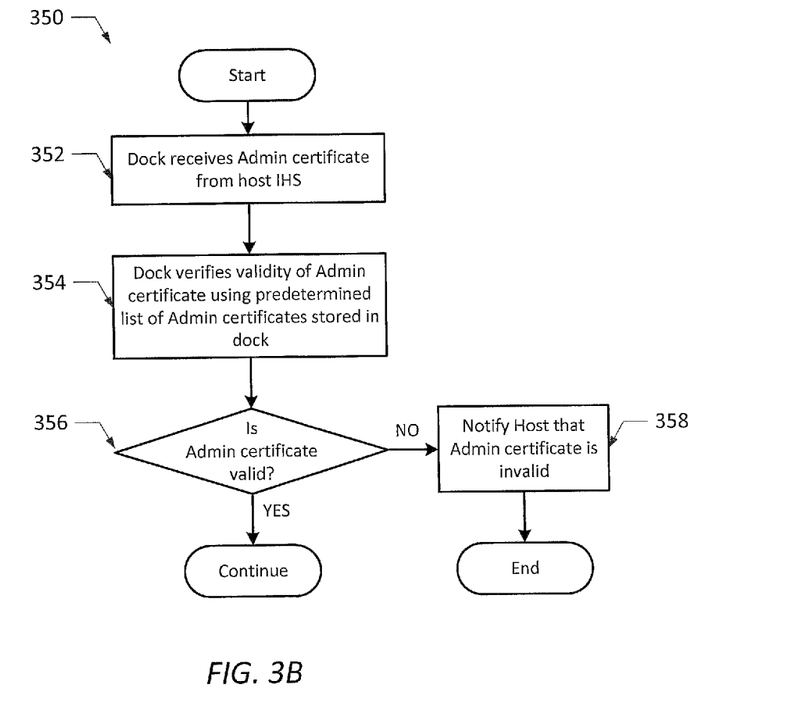
FIG. 3B is a flowchart diagram illustrating one embodiment of a method that may be performed by a docking station to verify the validity of an administrator certificate provided by an Admin IHS to the docking station.

Unlike the dock authentication process described above, however, the identity of Admin IHS 110 or IT administrator is verified by docking station 130. Since a network is not always available to the docking station for certificate verification online (e.g., through a network connected certificate authority), docking station 130 maintains a preconfigured list of valid Admin certificates 138 in a protected area in the docking station for Admin verification. The preconfigured list of valid Admin certificates 138 provides the docking station with the unique ability to verify the validity of the Admin certificate 114 stored within Admin IHS 110 (or Admin server 150) regardless of network availability or presence. Additional details of the Admin authentication process are illustrated in FIGS. 3B-4 and disclosed in more detail below.

Admin software 112 contains program instructions that may be stored within a computer readable storage medium (e.g., a HDD or SSD) and executed by a processing device 111 (e.g., a CPU or embedded controller) of Admin IHS 110 to manage and configure a group of information handling systems and peripheral devices. In the embodiment shown in FIG. 1, for example, Admin software 112 can be used by one or more IT administrators (or simply "Admins") to manage and configure docking station 130 during times when the docking station is docked with host IHS 120. In one example embodiment, an authorized Admin may utilize Admin software 112 to communicate one or more actions (otherwise referred to herein as "dock configuration actions") to docking station 130, via host IHS 120, to manage and make changes to the docking station. Such dock configuration actions may include, but are not limited to, reading docking station configuration information, updating docking station firmware 132, enabling/disabling ports on the docking station, and making other changes to the configuration, restrictions and/or security of the docking station.

When managing a docking station over a network, such as the network connection 115 between Admin IHS 110 and host IHS 120, malicious software ("malware") can be used to observe and modify the actions communicated over the network from the Admin IHS to the host IHS, thereby compromising docking station ownership and control. For example, malware can be used to modify the actions communicated from Admin IHS 110 to docking station 130 (via host IHS 120) to change restrictions set by the authorized Admin(s) on docking station capability and/or to downgrade the docking station firmware or security. To prevent malicious software from making unauthorized changes to docking station 130, various embodiments of systems and methods are provided herein for establishing a secure communication channel 160 between Admin IHS 110 and docking station 130. As set forth in more detail below, the secure communication channel 160 may be used to communicate one or more dock configuration actions from Admin IHS 110 to docking station 130 (via host IHS 120), thereby ensuring that only authorized Admins can access and make changes to the docking station.

The Transport Layer Security (TLS) protocol is an industry standard protocol, which is typically used to establish a trusted networking communication channel between a server and a web client. In the present disclosure, the TLS protocol is used to establish a secure communication channel 160 between Admin IHS 110 and docking station 130. More specifically, embodiments of the present disclosure leverage TLS symmetric encryption with an Elliptic Curve (ECC) based key exchange process to establish a secure communication channel 160 for Admin IHS 110 to communicate dock configuration action(s) securely to docking station 130 via the network connection 115 between Admin IHS 110 and host IHS 120 and the docking connection 125 between the host IHS and docking station 130.

To request a secure communication channel 160, host IHS 120 (operating as the TLS Client on behalf of the Admin IHS 110 and Admin software 112) and docking station 130 (operating as the TLS server) exchange hello messages specifying supported/chosen TLS protocol versions, random numbers and supported/chosen cipher suites and compression methods. As known in the art, a cipher suite specifies the protocol (e.g., TLS), key exchange algorithm (e.g., Elliptic Curve Diffie-Hellman, ECDH), authentication algorithm (e.g., Elliptic Curve Digital Signature Algorithm, ECDSA), data encryption algorithm (e.g., Advanced Encryption Standard, AES), and message authentication algorithm (e.g., Secure Hash Algorithm 256 bit, SHA256) supported by the TLS client and/or chosen by the TLS server. After hello messages are exchanged, docking station 130 sends dock certificate 134 to host IHS 120, so that the host IHS can verify the identity of the docking station.

According to one embodiment, the dock certificate 134 supplied by the docking station may be a USB-C certificate, which is stored in the docking station by the factory, rather than a typical network TLS certificate. Although USB-C certificates are commonly used to authenticate USB devices in accordance with the USB-C Authentication Specification, as set forth above, USB-C certificates are not typically used in TLS protocols.

Once the dock certificate 134 is verified, docking station 130 sends a certificate request to host IHS 120 requesting an Admin certificate 114 from Admin IHS 110. Upon receiving Admin certificate 114, docking station 130 verifies the validity of the Admin certificate against the preconfigured list of valid Admin certificates 138 stored in the protected area of the docking station. Once Admin certificate 114 is validated, the Admin/host IHSs and docking station perform cryptographic operations (e.g., ECDSA-ECDH) to generate pre-master secrets, master secrets, and symmetric session keys to be used for exchanging information across an encrypted communication channel 160. Both sides (i.e., the Admin/host IHSs and docking station) switch to symmetric encryption, allowing Admin IHS 110 to communicate dock configuration action(s) to the dock station 130 over the encrypted communication channel 160. After the dock configuration action(s) are completed by the docking station, the Admin/host IHSs and docking station delete the symmetric session keys and return to unencrypted communications.

FIGS. 2A-2B illustrate one embodiment of a method 200 that may be performed by host IHS 120 to verify the validity of docking certificate 134 and establish a secure communication channel 160 between Admin IHS 110 and docking station 130. According to one embodiment, a processing device 121 within host IHS 120 may execute program instructions within dock management software 122 to implement the method steps shown in FIGS. 2A-2B. FIGS. 3A-3B illustrate one embodiment of the method 300 that may be performed by docking station 130 to verify the validity of Admin certificate 114 and establish a secure communication channel 160 between the Admin IHS and docking station 130. According to one embodiment, a processing device 131 within docking station 130 may execute program instructions within firmware 132 to implement the method steps shown in FIGS. 3A-3B. FIG. 4 is workflow diagram illustrating further details of the methods shown in FIGS. 2A-2B and 3A-3B.

Referring to FIGS. 2A and 4, method 200 may begin, in one embodiment, when host IHS 120 receives at least one action (e.g., a dock configuration action) from Admin IHS 110 to manage and/or make changes to docking station 130 (in step 210). As shown in FIG. 4, Admin IHS 110 may send a message to host IHS 120 requesting the dock configuration action to be performed prior to method step 210. Upon receiving the dock configuration action (in step 210), host IHS 120 determines if the docking station 130 is connected to the host IHS (in step 220). If host IHS 120 is not connected or docked with docking station 130 (NO branch of step 220), the host IHS queues the dock configuration action (in step 225) until a docking connection is detected.

Once host IHS 120 is connected to docking station 130 (YES branch of step 220), the host IHS (operating as the TLS Client on behalf of Admin IHS 110 and Admin software 112) sends a ClientHello message to the docking station to initiate the TLS protocol (in step 230). In some embodiments (not shown in FIG. 2A), host IHS 120 may authenticate docking station 130 upon detecting a docking connection and prior to sending the ClientHello message in step 230. In one example embodiment, host IHS 120 may authenticate docking station 130 using the authentication protocols specified in the USB-C Authentication Specification, as set forth above. It is noted, however, that the dock authentication process is an optional step, which is not necessarily required in the method shown in FIG. 2A.

The ClientHello message sent by host IHS 120 to docking station 130 specifies a list of TLS protocol versions supported by the host IHS, a random number and a list of cipher suites and compression methods supported by the host IHS. Each cipher suite in the list may specify a protocol (e.g., TLS), key exchange algorithm (e.g., Elliptic Curve Diffie-Hellman, ECDH), authentication algorithm (e.g., Elliptic Curve Digital Signature Algorithm, ECDSA), data encryption algorithm (e.g., Advanced Encryption Standard, AES), and message authentication algorithm (e.g., Secure Hash Algorithm 256 bit, SHA256) supported by the TLS client. After receiving a ServerHello message from docking station 130 (see, step 320 of FIG. 3A), host IHS 120 receives a certificate message containing dock certificate 134 from the docking station and verifies the validity of the dock certificate with a dock certificate authority server (in step 240).

FIG. 2B is a flowchart diagram illustrating various method steps that may be performed by host IHS 120 to verify the validity of the dock certificate 134 provided by the docking station to the host IHS in step 240 of FIG. 2A. As shown in FIG. 2B, host IHS 120 receives dock certificate 134 from docking station 130 (in step 242) and verifies the validity of the dock certificate with dock certificate authority server 140 (in step 244). If dock certificate 134 is determined to be invalid (NO branch of step 246), host IHS 120 sends a notification message to the Admin IHS 110 indicating that the dock certificate is invalid (in step 248) and the method 200 shown in FIG. 2A ends. If dock certificate 134 is determined to be valid (YES branch of step 246), the method 200 shown in FIG. 2A continues in step 250.

Returning to FIG. 2A, host IHS 120 receives a certificate request from docking station 130 (in step 250) requesting an Admin certificate. In step 260, host IHS receives an Admin certificate 114 (which may be stored within Admin IHS 110 or Admin Server 150) from Admin IHS 110 and sends a certificate response containing the Admin certificate to the docking station for verification. Method steps performed by docking station 130 to verify the validity of Admin certificate 114 are shown in FIG. 3B and described in more detail below.

If the validity of the Admin certificate 114 is verified by the docking station, host IHS 120 derives a master secret from a pre-master secret provided by the Admin IHS 110 and uses the master secret to generate symmetric session keys (in step 270), which are subsequently used to encrypt/decrypt data communicated between the Admin IHS/host IHS and the docking station. In one example embodiment, host IHS 120 may send a certificate request to Admin IHS 110 to provide a pre-master secret, as shown in FIG. 4. In response to the certificate request, Admin IHS 110 may generate a pre-master secret using the private key 116 stored within the Admin IHS (or within Admin Server 150), and may send a certificate response containing the pre-master secret to host IHS 120. Upon receiving the pre-master secret, host IHS 120 derives a master secret (in step 270) using the pre-master secret received from the Admin IHS, the random number generated by the host IHS (and sent in the ClientHello message) and the random number generated by the docking station (and sent in the ServerHello message). This master secret is used by the host IHS to generate the symmetric session keys, which are subsequently used to encrypt/decrypt data communicated between the Admin IHS/host IHS and the docking station.

After deriving the master secret, host IHS 120 sends a ChangeCipherSpec message to docking station 130 (see FIG. 4) to establish a secure communication channel 160 between the Admin IHS/host IHS and the docking station. The ChangeCipherSpec message changes the encryption being used by both parties, so that any data exchanged between the two parties is encrypted using the symmetric session keys. After the encryption is changed, host IHS 120 sends a finished message to the docking station (see, FIG. 4) to complete the TLS handshake.

Once secure communication channel 160 is established, host IHS 120 may use the symmetric session keys generated from the master secret to encrypt the dock configuration action(s) within a secure message, which is sent to the docking station over the secure communication channel (in step 280). This ensures that only docking station 130 can decrypt the secure message and prevents malicious software from observing and modifying the dock configuration action(s). Host IHS 120 receives confirmation (in an encrypted, secure message) from docking station 130 that the dock configuration action was completed (in step 290). In some embodiments, the host IHS may destroy the session keys (in step 294) upon receiving the confirmation from docking station 130 that the dock configuration action was completed. Once the session keys are deleted, the secure communication channel 160 is closed and the Admin/host IHSs and docking station return to unencrypted communications.

In other embodiments, the host IHS may determine if one or more additional dock configuration actions are received from the Admin IHS (in optional step 292) If additional dock configuration action(s) are received from the Admin IHS in step 292 (YES branch of optional step 292), the host IHS may repeat method steps 280-290 for one or more additional dock configuration actions before destroying the session keys to close the secure communication channel (in step 294).

As noted above, FIG. 3A illustrates the method steps that may be performed by docking station 130 to establish a secure communication channel 160 between Admin IHS 110 and the docking station (via host IHS 120). As shown in FIGS. 3A and 4, method 300 may generally begin once docking station 130 is connected to the host IHS 120 (YES branch of step 310). After receiving a ClientHello message sent from host IHS 120 (in step 230 of FIG. 2A), docking station 130 sends a ServerHello message to the host IHS (in step 320). The ServerHello message sent by host IHS 120 to docking station 130 includes a random number, in addition to a TLS protocol version, cipher suite and compression method chosen by the docking station from the options offered by the host IHS in the ClientHello message. In step 330, docking station 130 sends a certificate message containing dock certificate 134 to host IHS 120, so that the host IHS can verify the validity of the dock certificate. Method steps performed by host IHS 120 to verify the validity of dock certificate 134 are shown in FIG. 2B and described above.

If the validity of the dock certificate 134 is verified by host IHS 120 (or by dock CA server 140), docking station 130 sends a certificate request to the host IHS requesting an Admin certificate (in step 340). As shown in FIG. 4, docking station 130 may send a ServerHelloDone message to host IHS 120 after sending the certificate request to confirm completion of the ServerHello message. In step 350, docking station 130 receives a certificate response containing an Admin certificate 114 from host IHS 120 and verifies the validity of the Admin certificate. As noted above, host IHS 120 may request and receive an Admin certificate 114 from Admin IHS 110, and may forward the Admin certificate to the docking station in a certificate response.

FIG. 3B is a flowchart diagram illustrating various method steps that may be performed by docking station 130 to verify the validity of the Admin certificate 114 provided by the Admin IHS to the docking station in step 350 of FIG. 3A. As shown in FIG. 3B, docking station 130 receives Admin certificate 114 from host IHS 120 (in step 352) and verifies the validity of the Admin certificate (in step 354). If Admin certificate 114 is determined to be invalid (NO branch of step 356), docking station 130 sends a notification message to host IHS 120 indicating that the Admin certificate is invalid (in step 358) and the method 300 shown in FIG. 3A ends. If Admin certificate 114 is determined to be valid (YES branch of step 356), the method 300 shown in FIG. 3A continues in step 360.

Unlike the dock certificate verification shown in FIG. 2B and described above, docking station 130 verifies the validity of the Admin certificate 114 against a preconfigured list of valid Admin certificates 138, which are stored in a protected area in the docking station. The preconfigured list of valid Admin certificates 138 provides the docking station with the unique ability to verify the validity of the Admin certificate 114 regardless of network availability or presence.

If the validity of the Admin certificate 114 is verified by docking station 130, the docking station generates a pre-master secret using the private key 136 stored within or generated by the docking station, derives a master secret from a pre-master secret, and generates symmetric session keys from the master secret (in step 360). The master secret is derived using the pre-master secret, the random number generated by the host IHS (and sent in the ClientHello message) and the random number generated by the docking station (and sent in the ServerHello message). This master secret is used by the docking station to generate the symmetric session keys, which are subsequently used to encrypt/decrypt data communicated between the Admin IHS/host IHS and the docking station.

After deriving the symmetric session keys, docking station 130 sends a ChangeCipherSpec message to host IHS 120 (see FIG. 4) to establish a secure communication channel 160 between the Admin IHS/host IHS and the docking station. As noted above, the ChangeCipherSpec message changes the encryption being used by both parties, so that any data exchanged between the two parties is encrypted using the symmetric session keys. After the encryption used by the parties is changed, docking station 130 sends a finished message to the host IHS (see FIG. 4) to complete the TLS handshake.

In step 370, docking station 130 receives a dock configuration action in a secure message, which is sent from the host IHS to the docking station over the secure communication channel 160 (in step 280 of FIG. 2A). In step 380, docking station 130 performs the dock configuration action and uses the master secret to send a confirmation of the completed action to the host in another secure message. More specifically, docking station 130 uses the symmetric session keys generated from the master secret to encrypt the confirmation of completed action within a secure message, which is sent to the host IHS over the secure communication channel 160. This ensures that only host IHS 120 can decrypt the secure message and prevents malicious software from tampering with the dock configuration actions. In some embodiments, docking station 130 may destroy the session keys (in step 390) after sending confirmation (in an encrypted, secure message) to the host IHS 120 that the action was completed (in step 380). Once the session keys are deleted, the secure communication channel 160 is closed and the Admin/host IHSs and docking station return to unencrypted communications.

In other embodiments, the docking station may determine if another secure message containing one or more additional dock configuration actions is received from the host IHS over the secure communication channel (in optional step 385) If another secure message is received from the host IHS in step 385 (YES branch of optional step 385), the docking station may repeat method steps 370-380 for one or more additional dock configuration actions before destroying the session keys to close the secure communication channel (in step 390).

It will be understood that one or more of the tasks, functions, or methodologies described herein may be implemented, for example, as firmware or as a computer program of instructions embodied in a non-transitory tangible computer readable medium that is executed by a CPU, controller, microcontroller, processor, microprocessor, FPGA, ASIC, or other suitable processing device.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A system, comprising:
an administrator information handling system (IHS) including a processing device configured to execute program instructions to communicate one or more dock configuration actions to a docking station;
a host IHS communicatively coupled to the administrator IHS via a network connection and communicatively coupled to the docking station via a docking connection, wherein the host IHS includes a processing device configured to execute program instructions to establish a secure communication channel over which the one or more dock configuration actions are communicated from the administrator IHS to the docking station via the host IHS; and
the docking station coupled to receive an administrator certificate from the admin IHS via the host IHS, wherein the docking station includes a processing device configured to execute program instructions to verify the validity of the administrator certificate against a preconfigured list of valid administrator certificates stored within the docking station before the secure communication channel is established.

2. The system recited in claim 1, wherein the host IHS is coupled to receive a dock certificate from the docking station and configured to verify the validity of the dock certificate with a dock certificate authority.

3. The system recited in claim 2, wherein the secure communication channel is established only if the validity of the dock certificate and the administrator certificate are respectively verified by the host IHS and the docking station.

4. The system recited in claim 1, wherein the host IHS and the docking station utilize Transport Layer Security (TLS) protocols to generate symmetric session keys, which are used by the host IHS to encrypt the one or more dock configuration actions within a first secure message, which is communicated to the docking station over the secure communication channel.

5. The system recited in claim 4, wherein after performing the one or more dock configuration actions specified in the first secure message, the docking station uses the symmetric session keys to encrypt a confirmation that the dock configuration actions were completed within a second secure message, which is communicated to the host IHS over the secure communication channel.

6. The system recited in claim 5, wherein after the second secure message is communicated from the docking station to the host IHS, the docking station and the host IHS delete the symmetric session keys to close the secure communication channel and return to unencrypted communications.

7. The system recited in claim 5, wherein after the second secure message is communicated from the docking station to the host IHS:
the host IHS uses the symmetric sessions keys to encrypt one or more additional dock configuration actions within a third secure message, which is communicated to the docking station over the secure communication channel;
the docking station uses the symmetric session keys to encrypt a confirmation that the one or more additional dock configuration actions were completed within a fourth secure message, which is communicated to the host IHS over the secure communication channel; and
the docking station and the host IHS delete the symmetric session keys to close the secure communication channel after the fourth secure message is communicated to the host.

8. A method performed by a host information handling system (IHS) to establish a secure communication channel between an administrator IHS and a docking station, the method comprising:
receiving a dock configuration action from the administrator IHS via a network connection connecting the administrator IHS to the host IHS;
queuing the dock configuration action until the docking station is connected to the host IHS via a docking connection;
wherein upon detecting the docking connection, the method further comprises:
sending a client hello message to, and receiving a server hello message from, the docking station to initiate a Transport Layer Security (TLS) protocol;
receiving a certificate message containing a Universal Serial Bus (USB) Type-C certificate from the docking station; and
verifying the validity of the USB Type-C certificate with a dock certificate authority server prior to establishing the secure communication channel between the administrator IHS and the docking station.

9. The method recited in claim 8, wherein if the validity of the USB Type-C certificate is verified by the host IHS, the method further comprises receiving a certificate request from the docking station requesting an administrator certificate, and once received from the administrator IHS, sending a certificate response containing the administrator certificate to the docking station for verification.

10. The method recited in claim 9, wherein if the validity of the administrator certificate is verified by the docking station, the method further comprises:
receiving a pre-master secret from the administrator IHS, wherein the pre-master secret is generated by the administrator IHS using a private key associated with an administrator;
deriving a master secret from the pre-master secret, a random number included within the client hello message and a random number included within the server hello message; and
generating symmetric session keys from the master secret.

11. The method recited in claim 10, further comprising sending a ChangeCipherSpec message to the docking station to establish the secure communication channel between the administrator IHS and the docking station.

12. The method recited in claim 10, further comprising using the symmetric session keys to encrypt the dock configuration action within a first secure message, which is sent from the host IHS to the docking station over the secure communication channel.

13. The method recited in claim 12, further comprising receiving a confirmation that the dock configuration action was completed by the docking station within a second secure message, which is sent from the docking station to the host IHS over the secure communication channel.

14. The method recited in claim 13, wherein upon receiving the second secure message, the method further comprises one of the following:
destroying the symmetric session keys to close the secure communication channel and return to unencrypted communications; or
repeating, for one or more additional dock configuration actions, the steps of using the symmetric session keys and receiving a confirmation before destroying the symmetric session keys to close the secure communication channel and return to unencrypted communications.

15. A method performed by a docking station to establish a secure communication channel between an administrator IHS and the docking station, wherein upon docking with a host IHS, the method comprises:
receiving a client hello message from, and sending a server hello message to, the host IHS to initiate a Transport Layer Security (TLS) protocol;
sending a certificate message containing a Universal Serial Bus (USB) Type-C certificate to the host IHS for verification, wherein if the validity of the USB Type-C certificate is verified by the host IHS, the method further comprises:
sending a certificate request to the host IHS requesting an administrator certificate, which is associated with the administrator IHS;
receiving a certificate response containing the administrator certificate from the host IHS; and
verifying the validity of the administrator certificate against a preconfigured list of valid administrator certificates stored within the docking station prior to establishing the secure communication channel between the administrator IHS and the docking station.

16. The method as recited in claim 15, wherein if the validity of the administrator certificate is verified by the docking station, the method further comprises:
generating a pre-master secret using a private key stored within the docking station;
deriving a master secret from the pre-master secret, a random number included within the client hello message and a random number included within the server hello message; and
generating symmetric session keys from the master secret.

17. The method recited in claim 16, further comprising sending a ChangeCipherSpec message to the host IHS to establish the secure communication channel between the administrator IHS and the docking station.

18. The method recited in claim 16, further comprising receiving a dock configuration action within a first secure message, which is sent from the host IHS to the docking station over the secure communication channel.

19. The method recited in claim 18, further comprising:
performing the dock configuration action specified in the first secure message;
using the symmetric session keys to encrypt a confirmation that the dock configuration action was completed by the docking station within a second secure message; and
sending the second secure message to the host IHS over the secure communication channel.

20. The method recited in claim 19, wherein after sending the second secure message, the method further comprises one of the following:
destroying the symmetric session keys to close the secure communication channel and return to unencrypted communications; or
repeating the steps of receiving a dock configuration action, performing the dock configuration action, using the symmetric session keys and sending the second secure message for one or more additional dock configuration actions before destroying the symmetric session keys to close the secure communication channel and return to unencrypted communications.

* * * * *